US012676371B2

(12) United States Patent (10) Patent No.: US 12,676,371 B2
Wang et al. (45) Date of Patent: Jul. 7, 2026

(54) BATTERY HOUSING AND BATTERY

(71) Applicant: Zhuhai CosMX Battery Co., Ltd., Zhuhai (CN)

(72) Inventors: Yongwang Wang, Zhuhai (CN); Yuxiang Zeng, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 725 days.

(21) Appl. No.: 18/055,413

(22) Filed: Nov. 15, 2022

(65) Prior Publication Data

US 2023/0076187 A1 Mar. 9, 2023

Related U.S. Application Data

(63) Continuation of application No. PCT/CN2021/114396, filed on Aug. 24, 2021.

(30) Foreign Application Priority Data

Aug. 28, 2020 (CN) .......................... 202010885446.2

(51) Int. Cl.
*H01M 50/197* (2021.01)
*H01M 50/143* (2021.01)
*H01M 50/184* (2021.01)
(52) U.S. Cl.
CPC ....... *H01M 50/197* (2021.01); *H01M 50/143* (2021.01); *H01M 50/184* (2021.01)
(58) Field of Classification Search
CPC ............................................ H01M 50/00–198
See application file for complete search history.

(56) References Cited

U.S. PATENT DOCUMENTS 4,567,121 A * 1/1986 Gilmour ............. H01M 50/179
429/185

FOREIGN PATENT DOCUMENTS

CN 202395058 U 8/2012
CN 111029487 A 4/2020
CN 111162228 A 5/2020
(Continued)

OTHER PUBLICATIONS

The first Office Action received in corresponding CN Application 202010885446.2.
(Continued)

*Primary Examiner* — Jonathan G Leong
(74) *Attorney, Agent, or Firm* — Kilpatrick Townsend & Stockton LLP

(57) ABSTRACT

The present application provides a battery housing and a battery, where the battery housing includes a first cover body, a second cover body, a sealing member and a housing body, the second cover body is welded to the housing body, and the first cover body is adhered to the second cover body through the sealing member, so as to seal the housing body; where an adhesion force between the first cover body and the second cover body is less than a first pressure, the first pressure is a pressure borne by the battery housing when the battery housing explodes. When the battery explodes, an adhesion force layer between the first cover body and the second cover body can be broken through to release gas generated in the battery housing, avoiding an explosion due to a continuous increase of an internal pressure of the battery housing.

17 Claims, 3 Drawing Sheets

(56)  References Cited

FOREIGN PATENT DOCUMENTS

| | | | |
|---|---|---|---|
| CN | 211238301 | U | 8/2020 |
| CN | 111900276 | A | 11/2020 |
| EP | 0081339 | A2 | 6/1983 |

OTHER PUBLICATIONS

The second Office Action received in corresponding CN Application 202010885446.2.
The international search report and written opinion received in corresponding PCT Application PCT/CN2021/114396, mailed Nov. 3, 2021.
Zijun Ma, "Q&A on oilfield development water treatment technology", published Oct. 31, 2003 on China Petrochemical Press.
Fengxiang Zhai, "Fundamentals of Material Forming Process", published Feb. 28, 2018 on Harbin Institute of Technology Press.

* cited by examiner

BATTERY HOUSING AND BATTERY

CROSS-REFERENCE TO RELATED APPLICATIONS

This application is a continuation of International Application No. PCT/CN2021/114396, filed on Aug. 24, 2021, which claims priority to Chinese Patent Application No. 202010885446.2, filed with the China National Intellectual Property Administration on Aug. 28, 2020, entitled "Battery Housing and Battery", both of the above applications are hereby incorporated by reference in their entireties.

TECHNICAL FIELD

The present application relates to the technical field of lithium-ion batteries, and more particularly, to a battery housing and a battery.

BACKGROUND

With the progress and development of science and technology, people's demands for wearable devices, such as wireless headphones, sports watches, bracelets, rings, and other electronic products are increasing. Due to the miniaturization design of the wearable devices, such products have high requirements for the space size and performance of batteries.

Lithium-ion batteries may produce battery housing rupture or even explosion due to battery cell performance problems, or battery operation temperature, short circuit, and other reasons, seriously endangering the personal safety of users.

It can be seen that the existing battery housings have a problem of poor explosion-proof effect.

SUMMARY

An object of embodiments of the present application is to provide a battery housing and a battery, which solves the problem of poor explosion-proof effect of the battery housings in the prior art.

In order to achieve the above object, in a first aspect, an embodiment of the present application provides a battery housing, which includes a first cover body, a second cover body, a sealing member, and a housing body, where the second cover body is welded to the housing body, the first cover body is adhered to the second cover body through the sealing member, so as to seal the housing body; where an adhesion force between the first cover body and the second cover body is less than a first pressure, the first pressure is a pressure borne by the battery housing when exploding.

Optionally, the first pressure is 25 N to 200 N.

Optionally, the adhesion force is 20 N to 100 N.

Optionally, a surface of the first cover body and a surface of the second cover body are both covered with a passivation layer, and a thickness of the passivation layer is 1 μm to 3 μm. The adhesion force is proportional to the thickness of the passivation layer.

Optionally, a thickness of the sealing member is 0.1 mm to 0.3 mm, and the adhesion force is proportional to the thickness of the sealing member.

Optionally, the sealing member includes a first material layer, a base layer, and a second material layer, which are sequentially arranged in layers, where the first material layer is adhered to the first cover body, and the second material layer is adhered to the second cover body.

Optionally, a thickness of the first material layer is 0.05 mm to 0.1 mm, a thickness of the base layer is 0.05 mm to 0.1 mm, and a thickness of the second material layer is 0.05 mm to 0.1 mm.

Optionally, an area of the sealing member is less than an area of the first cover body and more than 2/3 of an overlapping area between the first cover body and the second cover body. The adhesion force is proportional to the area of the sealing member.

Optionally, an outer diameter of the first cover body is 7 mm to 15 mm, an outer diameter of the sealing member is 7.5 mm to 15.5 mm, and an outer diameter of the second cover body is 8 mm to 16 mm.

In a second aspect, an embodiment of the present application provides a battery, including the battery housing provided in the first aspect of the embodiment of the present application.

At least one technical solution of the above technical solutions has the following advantages or beneficial effects:

The embodiments of the present application provides a battery housing and a battery, where the battery housing includes a first cover body, a second cover body, a sealing member, and a housing body, the second cover body is welded to the housing body, the first cover body is adhered to the second cover body through the sealing member to seal the housing body; where an adhesion force between the first cover body and the second cover body is less than a first pressure, and the first pressure is a pressure borne by the battery housing when the battery housing explodes. When the battery explodes, an adhesive layer between the first cover body and the second cover body can be broken through to release gas generated in the battery housing, so as to avoid an explosion caused by a continuous increase of an internal pressure of the battery housing.

DESCRIPTION OF EMBODIMENTS

The technical solutions in the embodiments of the present application will be described clearly and completely below in combination with drawings in the examples of the present application. Obviously, the described examples are a part of the examples of the present application, but not all of them. Based on the examples in the present application, all other examples obtained by ordinary skilled in the art without creative work belong to the protection scope of the present application.

Figures 1, 2:
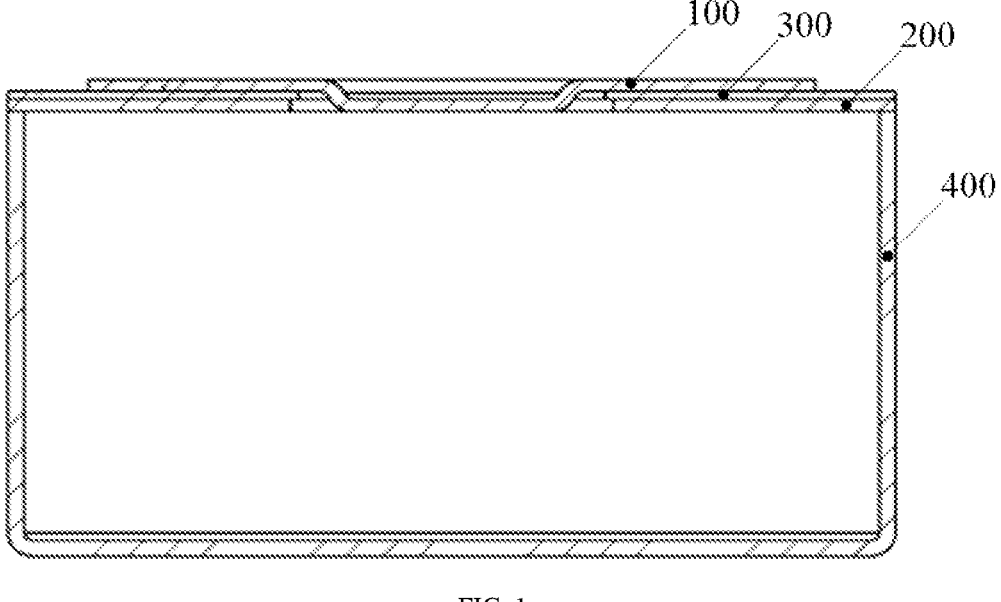
FIG. 1 is a structural diagram of a battery housing provided by an example of the present application.
FIG. 2 is a partial structural diagram of a battery housing provided by an example of the present application.

As shown in FIG. 1, an example of the present application provides a battery housing.

The battery housing includes a first cover body 100, a second cover body 200, a sealing member 300, and a housing body 400. The second cover body 200 is welded to the housing body 400, the first cover body 100 is adhered to the second cover body 200 through the sealing member 300 to seal the housing body 400; where, an adhesion force between the first cover body 100 and the second cover body 200 is less than a first pressure, and the first pressure is a pressure borne by the battery housing when exploding.

Where the first cover body 100, the second cover body 200, and the housing body 400 can be formed by a metal material, such as aluminum, copper, stainless steel, nickel, etc. The sealing member 300 can be formed by a non-metallic insulating material, specifically, a high temperature resistant and anti-corrosion material, such as ethylene pro-pylene diene monomer, fluororubber, polyether-ether-ketone (PEEK), PFA, etc. A shape of the sealing member 300 can be a sealing ring or a sealing sheet, it is not limited here.

In the example of the present application, the battery housing can be applied to a button-type battery.

Where the housing body 400 can be a chamber with an opening on one side, including a bottom wall and a side wall arranged along an outer edge of the bottom wall. The second cover body 200 is covered on an opening side of the housing body 400 and welded to the housing body 400. The first cover body 100 is adhered to the second cover body 200 through the sealing member 300 to seal the housing body 400 and realize insulation between the first cover body 100 and the second cover body 200. The housing body 400, the first cover body 100, the second cover body 200, and the sealing member 300 form a holding chamber of the battery body, the holding chamber can be used to hold a battery cell.

As shown in FIG. 2, a middle part of the second cover body 200 is provided with a through hole. A position of the first cover body 100 corresponding to the through hole bulges towards a direction of the second cover body 200 to form a boss part adapted to the through hole. The sealing member 300 can be sleeved around an outer wall of the boss part, and the boss part can be embedded into the through hole. One lug of the battery cell held in the holding chamber can extend out of the through hole and be welded to the first cover body 100, and another lug can be welded to the housing body 400.

A lithium-ion battery may explode due to a performance problem of the battery cell, or an operation temperature of the battery, or short circuit of the battery cell. In the prior art, an explosion-proof groove is usually provided on the battery housing to achieve an explosion-proof effect. However, when designing the explosion-proof groove, if the groove of the explosion-proof groove is too deep, a mechanical strength of the battery housing may be insufficient; if the groove of the explosion-proof groove is too shallow, the explosion-proof groove can be broken through only when an internal pressure of the battery housing is very large, and thus it cannot achieve a good explosion-proof effect.

In the example of the present application, the first cover body 100 and the second cover body 200 are adhered through extruding the sealing member 300 by a thermal compounding treatment. In a process of the thermal com-pounding treatment, an adhesion force between the first cover body 100 and the second cover body 200 can be adjusted by adjusting a parameter of the sealing member 300 and a parameter of the thermal compounding so that the adhesion force is less than the first pressure, i.e., the pressure borne by the battery when the battery explodes. In this way, when the battery is in normal use, the battery housing can be sealed through the first cover body 100, the second cover body 200, the sealing member 300, and the housing body 400, and have a stable strength. When an internal pressure of the battery housing gradually increases due to abnormal use of the battery, and the internal pressure of the battery housing reaches the first pressure, an adhesive layer between the first cover body 100 and the second cover body 200 can be broken through to release gas and avoid an explosion due to a continuous increase of an internal pressure of the battery housing.

Figure 3:
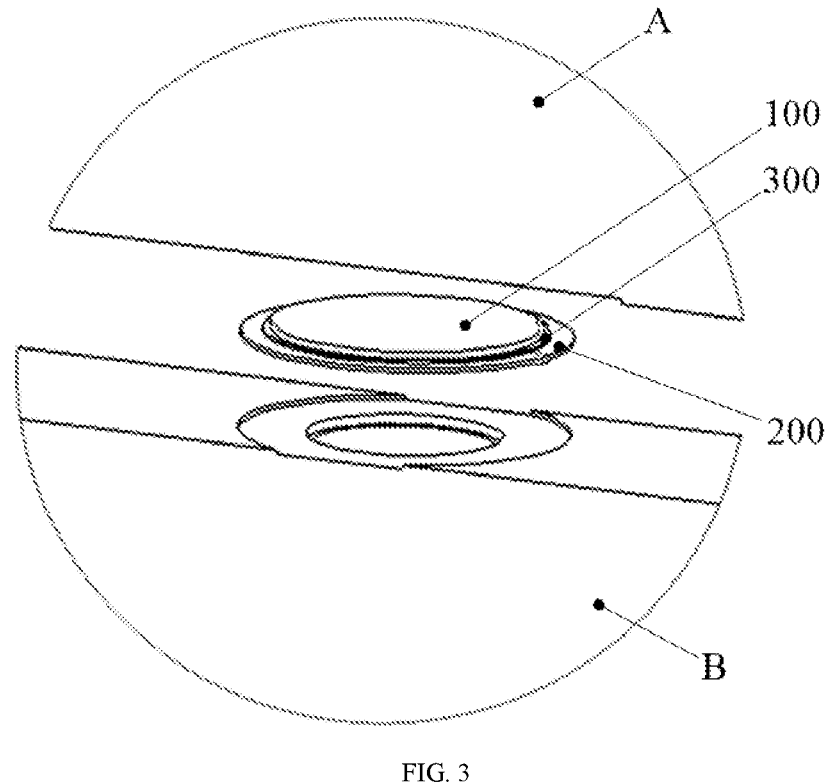
FIG. 3 is a thermal compounding diagram in a manufacturing method of a battery housing provided by an example of the present application.

In a specific implementation, as shown in FIG. 3, the first cover body 100 can be placed in a thermal compounding head A, the second cover body 200 can be placed in a thermal compounding head B, and the sealing member 300 can be placed between the first cover body 100 and the second cover body 200. The head A and head B can respectively drive the first cover body 100 and the second cover body 200 to extrude the sealing member 300, and temperatures of the head A and head B enable the sealing member 300 to quickly melt, to achieve the adhesion between the first cover body 100 and the second cover body 200. In this process, the adhesion force between the first cover body 100 and the second cover body 200 can be measured with a tensile tester.

In the example of the present application, the first cover body 100 is adhered to the second cover body 200 through the sealing member 300 to seal the housing body 400, and the adhesion force between the first cover body 100 and the second cover body 200 is less than the pressure borne by the battery housing when the battery housing explodes. In case of battery failure, the adhesive layer between the first cover body 100 and the second cover body 200 can be broken through to release the gas generated in the battery housing, and avoid an explosion due to a continuous increase of the internal pressure of the battery housing.

Optionally, the first pressure is 25 N to 200 N.

Furthermore, the adhesion force is 20 N to 100 N.

In this example, the first pressure, i.e., a maximum pressure that the battery housing bears when the battery housing explodes, can be obtained by conducting an explo-sion experiment on the battery housing. Specifically, by drawing a pressure sensor from an interior of the sealed battery housing, an internal pressure change of the battery housing can be measured and recorded, and the explosion experiment on the battery housing can be conducted by heating, etc., to record internal pressure values of the battery housing before the battery housing is exploded.

In this example, in order to further reduce the danger when the adhesive layer is broken, and ensure that the battery housing has a stable strength when the battery is in normal use, the first pressure can be determined as 25 N to 200 N. Furthermore, the adhesion force can be determined as 20 N to 100 N.

In this example, during the thermal compounding treat-ment, the adhesion force between the first cover body 100 and the second cover body 200 can be adjusted by adjusting the parameter of the sealing member 300 and the parameter of the thermal compounding, and the adhesion force can be measured by a tensile tester so as to control the adhesion force to be less than the first pressure. The parameter of the sealing member 300 may include an area of the sealing member 300, a thickness of the sealing member 300, and a contact area between the sealing member 300 and the first cover body 100. The above thermal compounding parameter may include temperature, pressure, time, etc. of the thermal compounding.

In one embodiment, the adhesion force between the first cover body and the second cover body can be adjusted by adjusting the temperature of the thermal compounding and/or the pressure of the thermal compounding during the thermal compounding process.

In this embodiment, the adhesion force is proportional to the thermal compounding temperature. As shown in Table 1, exemplarily, on the premise that other factors are consistent, an adhesion force at a thermal compounding temperature of 150° C. is greater than an adhesion force at a thermal compounding temperature of 135° C. In a specific implementation, the thermal compounding temperature first needs to meet that it is higher than a melting point of the sealing member 300, so that the sealing member 300 may melt rapidly; while in order to prevent excessive melting of the sealing member 300, an initial temperature of thermal compounding can be controlled within a range of the melting point 300° C. of the sealing member plus 3° C., and then the temperature of thermal compounding can be gradually increased, thereby gradually increasing the adhesion force between the first cover body 100 and the second cover body 200.

μm to 3 μm. The adhesion force is proportional to the thickness of the passivation layer.

In this embodiment, before the first cover body 100 and the second cover body 200 are subjected to thermal compounding sealing, the surface of the first cover body 100 and the surface of the second cover body 200 can be subjected to a passivation treatment so as to form the passivation layer on the surface of the first cover body 100 and the surface of the second cover body 200. The passivation layer can improve a corrosion resistance performance of the first cover body 100 and the second cover body 200, and can improve a strength of the first cover body 100 and the second cover body 200 to a certain extent, so that when the battery explodes and the adhesive layer between the first cover body 100 and the second cover body 200 is broken through, the first cover body 100 and the second cover body 200 will not explode.

TABLE 1

| Parameters | Example 1 | Comparative example 1 |
|---|---|---|
| Thermal compounding temperature (° C.) | 135 | 150 |
| Thermal compounding pressure (N) | 100 | 100 |
| Thickness of the sealing member before extrusion (mm) | 0.3 | 0.3 |
| Thickness of the sealing member after extrusion (mm) | 0.2 | 0.2 |
| Material of the sealing member | PP | PP |
| Contact area between the sealing member and the first cover body (mm$^2$) | 5.2 | 5.2 |
| Thicknesses of passivation layers between the cover bodies and the housing bodies (μm) | 2.3 | 2.3 |
| Adhesion force between the first cover body and the second cover body (N) | 10 | 40 |
| The first pressure (N) | 28.5 | 28.5 |

In this embodiment, when the pressure of the thermal compounding is 100 N to 500 N, the adhesion force is proportional to the pressure of the thermal compounding. As shown in Table 2, exemplarily, on the premise that other factors are consistent, an adhesion force at a thermal compounding pressure of 180 N is greater than an adhesion force at a thermal compounding pressure of 130 N. In a specific implementation, the pressure of thermal compounding can be gradually increased in the range of 100 N to 500 N, and thereby the adhesion force between the first cover body 100 and the second cover body 200 can be gradually increased.

In this example, a thickness of the passivation layer is 1 μm to 3 μm. The adhesion force is proportional to the thickness of the passivation layer. As shown in Table 3, exemplarily, on the premise that other factors are consistent, an adhesion force when the passivation layer is 2.3 μm, is greater than an adhesion force when the passivation layer is 1.4 μm. In a specific implementation, the thickness of the formed passivation layer can be controlled by controlling the time, temperature, acidity ratio and other parameter value

TABLE 2

| Parameters | Example 2 | Comparative example 2 |
|---|---|---|
| Thermal compounding temperature (° C.) | 150 | 150 |
| Thermal compounding pressure (N) | 130 | 180 |
| Thickness of the sealing member before extrusion (mm) | 0.3 | 0.3 |
| Thickness of the sealing member after extrusion (mm) | 0.15 | 0.10 |
| Material of the sealing member | PP | PP |
| Contact area between the sealing member and the first cover body (mm$^2$) | 5.2 | 5.2 |
| Thicknesses of the passivation layers between the cover bodies and the housing bodies (pm) | 2.3 | 2.3 |
| Adhesion force between the first cover body and the second cover body (N) | 56 | 80 |
| The first pressure (N) | 28.5 | 28.5 |

Optionally, a surface of the first cover body 100 and a surface of the second cover body 200 are both covered with a passivation layer, a thickness of the passivation layer is 1 during a passivation treatment, and then the adhesion force between the first cover body 100 and the second cover body 200 can be correspondingly adjusted.

TABLE 3

| Parameters | Example 3 | Comparative example 3 |
|---|---|---|
| Thermal compounding temperature (° C.) | 150 | 150 |
| Thermal compounding pressure (N) | 100 | 100 |
| Thickness of the sealing member before extrusion (mm) | 0.3 | 0.3 |
| Thickness of the sealing member after extrusion (mm) | 0.2 | 0.2 |
| Material of the sealing member | PP | PP |
| Contact area between the sealing member and the first cover body (mm$^2$) | 5.2 | 5.2 |
| Thicknesses of the passivation layers between the cover bodies and the housing bodies (pm) | 1.4 | 2.3 |
| Adhesion force between the first cover body and the second cover body (N) | 25.3 | 40 |
| The first pressure (N) | 28.5 | 28.5 |

Optionally, the thickness of the sealing member 300 is 0.1 mm to 0.3 mm, and the adhesion force is proportional to the thickness of the sealing member 300.

Where the thickness of the sealing member 300 refers to a thickness of the sealing member 300 before the sealing member is extruded and melted.

In this example, the thickness of the sealing member 300 is 0.1 mm to 0.3 mm. Within this range, the adhesion force is proportional to the thickness of the sealing member 300. It can also be understood in this way that the changes of temperature, pressure and other thermal compounding parameter during the thermal compounding treatment can cause the sealing member 300 with the same thickness to show different extrusion degrees, and thus affect the adhesion force.

Figure 4:
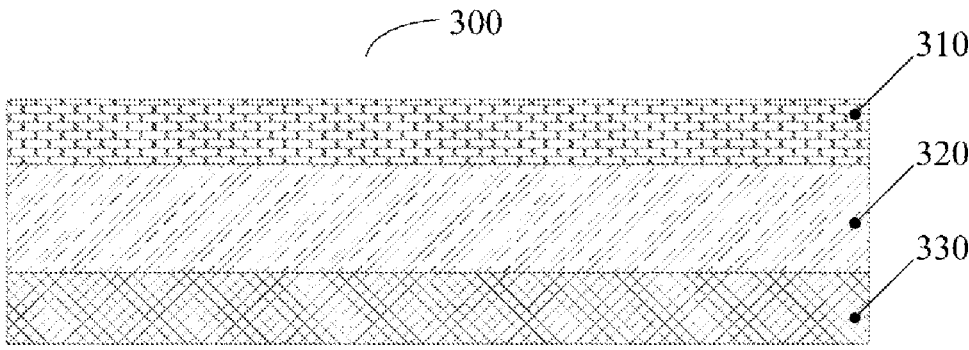
FIG. 4 is a structural diagram of a sealing member in a battery housing provided by an example of the present application.

Optionally, as shown in FIG. 4, the sealing member 300 includes a first material layer 310, a base layer 320, and a second material layer 330, which are sequentially arranged in layers. The first material layer 310 is adhered to the first cover body 100, and the second material layer 330 is adhered to the second cover body 200.

In this example, the sealing member 300 can be composed by three layers of materials. As shown in FIG. 4, the sealing member 300 can be composed by the first material layer 310, the base layer 320, and the second material layer 330, which are sequentially arranged in layers. The first material layer 310 and the second material layer 330 are both a material, a melting point of which can be 100° C. to 400° C. During a thermal compounding treatment, a thermal compounding temperature is slightly higher than the melting points of the first material layer 310 and the second material layer 330, which can make the first material layer 310 and the second material layer 330 melt rapidly; the melting point of the base layer 320 is higher than the melting points of the first material layer 310 and the second material layer 330, and can be higher than 400° C., so as to ensure that the base layer 320 will not melt during the thermal compounding treatment, and an adhesive layer is formed between the first cover body 100 and the second cover body 200.

Furthermore, a thickness of the first material layer is 0.05 mm to 0.1 mm, a thickness of the base layer is 0.05 mm to 0.1 mm, and a thickness of the second material layer is 0.05 mm to 0.1 mm.

Optionally, an area of the sealing member 300 is less than an area of the first cover body 100 and more than ⅔ of an overlapping area between the first cover body 100 and the second cover body 200. The adhesion force is proportional to the area of the sealing member 300.

Where, the area of the sealing member 300 can be understood as a contact area between the sealing member 300 and both the first cover body 100 and the second cover body 200. It should be noted that the area of the sealing member 300 refers to an area of the sealing member 300 before the sealing member is extruded and melted.

In this example, when the area of the sealing member 300 is smaller than the area of the first cover body 100 and larger than ⅔ of the overlapping area between the first cover body 100 and the second cover body 200, the adhesion force is proportional to the area of the sealing member 300. As shown in Table 4, exemplarily, on the premise that other factors are consistent, an adhesion force when the contact area between the sealing member 300 and the first cover body 100 is 5.2 mm$^2$, is greater than an adhesion force when the contact area between the sealing member 300 and the first cover body 100 is 4.5 mm$^2$. In a specific implementation, the adhesion force between the first cover body 100 and the second cover body 200 can be adjusted by changing the area of the sealing member 300.

TABLE 4

| Parameters | Example 4 | Comparative example 4 |
|---|---|---|
| Thermal compounding temperature (° C.) | 150 | 150 |
| Thermal compounding pressure (N) | 100 | 100 |
| Thickness of the sealing member before extrusion (mm) | 0.3 | 0.3 |
| Thickness of the sealing member after extrusion (mm) | 0.2 | 0.2 |
| Material of the sealing member | PP | PP |
| Contact area between the sealing member and the first cover body (mm$^2$) | 4.5 | 5.2 |
| Thicknesses of the passivation layers between the cover bodies and the housing bodies (pm) | 2.3 | 2.3 |
| Adhesion force between the first cover body and the second cover body (N) | 32 | 40 |
| The first pressure (N) | 28.5 | 28.5 |

Furthermore, an outer diameter of the first cover body 100 is 7 mm to 15 mm, an outer diameter of the sealing member 300 is 7.5 mm to 15.5 mm, and an outer diameter of the second cover body 200 is 8 mm to 16 mm.

Figure 5:
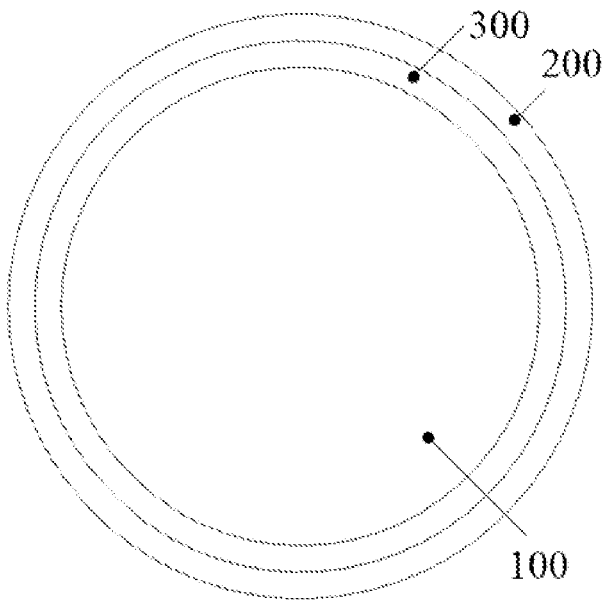
FIG. 5 is a partial top view of a battery housing provided by an example of the present application.

In this example, as shown in FIG. 5, both the first cover body 100 and the second cover body 200 are in a disk shape, and the sealing member 300 is a sealing ring. When the first cover body 100 and the second cover body 200 extrude the sealing member 300 to form the battery housing, the outer diameter of the first cover body 100 is less than or equal to the outer diameter of the sealing member 300, and the outer diameter of the sealing member 300 is less than or equal to the outer diameter of the second cover body 100.

To sum up, in the example of the present application, the battery housing includes a first cover body, a second cover body, a sealing member, and a housing body, the second cover body is welded to the housing body, and the first cover body is adhered to the second cover body through the sealing member to seal the housing body. Where, an adhesion force between the first cover body and the second cover body is less than a first pressure, where the first pressure is a pressure borne by the battery housing when the battery housing explodes. When the battery explodes, the adhesive layer between the first cover body and the second cover body can be broken through to release gas generated in the battery housing, avoiding an explosion due to a continuous increase of an internal pressure of the battery housing.

An example of the present application also provides a battery, and the battery includes the battery housing provided by the examples shown in FIGS. 1 to 5.

In the example of the present application, the battery can be a button-type battery. The battery includes the battery housing provided in the examples shown in FIGS. 1 to 5 and a battery cell. The battery housing is filled with an electrolyte, and the battery cell is held in the battery housing.

Specifically, the first cover body of the battery housing is adhered to the second cover body through a sealing member to achieve insulation between the first cover body and the second cover body. A middle part of the second cover body can be provided with a through-hole, a position of the first cover body corresponding to the through-hole bulges towards a direction of the second cover body to form a boss part adapted to the through-hole, the sealing member can be sleeved around an outer wall of the boss part, and the boss part can be embedded in the through-hole. One lug of the battery cell held in the holding chamber can extend out of the through hole to be welded with the first cover body, and another lug can be welded to the housing body.

In the example of the present application, the battery cell can be a laminated battery cell or a wound battery cell.

The wound battery cell is composed of a positive electrode sheet, a first diaphragm sheet, a negative electrode sheet, and a second diaphragm sheet, which are successively laminated and wound. A cavity is formed in the center of the wound battery cell. The positive electrode sheet or the negative electrode sheet is extended with a corresponding lug. Where one lug can extend out of the through hole to be welded with the first cover body, and the other lug can be welded with the housing body. The first diaphragm sheet and the second diaphragm sheet are located between the positive electrode sheet and the negative electrode sheet to have a function of insulate and prevent short circuit of the battery cell.

The laminated battery cell can be formed by a positive electrode sheet, a diaphragm sheet, and a negative sheet, which are sequentially and cyclically laminated, and the diaphragm sheet is arranged between each pair of adjacent positive electrode sheet and negative electrode sheet to function as insulation so as to prevent short circuit of the battery cell. Each positive electrode sheet is extended with at least one positive electrode lug, and each negative electrode sheet is extended with at least one negative electrode lug. All positive electrode lugs are assembled to form a first electrode lead, and all negative electrode lugs are assembled to form a second electrode lead.

It should be noted that in the example of the present application, the battery includes all the technical features of the battery housing provided in the examples shown in FIGS. 1 to 5, and can achieve all the technical effects that can be achieved by the battery housing provided in the examples shown in FIGS. 1 to 5. In order to avoid repetition, it will not be repeated here.

It should be noted that the multiple optional embodiments described in the examples of the present application can be implemented in combination with each other or separately, and the examples of the present application have no limitation thereto.

In the description of the present application, it should be understood that the terms "up", "down", "left", "right" and other indicating orientations or positional relationships are based on the orientations or positional relationships shown in the drawings, only for the convenience of description of the present application and simplifying the description, rather than indicating or implying that the device or member referred to must have a specific orientation, as well as a specific orientation construction and operation. Therefore, they cannot be understood as a limitation of the present application. In addition, "first" and "second" are only for the purpose of description, and cannot be understood as indicating or implying relative importance or implying the number of indicated technical features. Therefore, a feature defined as "first" or "second" may explicitly or implicitly include one or more such features. In the description of the present application, unless otherwise specified, "multiple" means two or more.

In the description of the present application, it should be noted that, unless otherwise specified and defined, the terms "install", "connect" and "connection" should be understood broadly, for example, they can refer to a fixed connection, a removable connection, or an integrated connection; they can refer to a mechanical connection or an electrical connection; they can refer to a direct connection or an indirect connection through an medium, and can refer to an internal communication of two components. For ordinary skilled in the art, the specific meaning of the above terms in the present application can be understood according to a specific case.

The above examples are described with reference to the drawings. Other different forms and examples are also feasible without departing from the principle of the present application. Therefore, the present application should not be constructed as a limitation to the examples described herein. More specifically, these examples are provided so that the present application will be perfect and complete, and the scope of the present application will be conveyed to those skilled in the art. In the drawings, component dimensions and relative dimensions may be exaggerated for clarity. The terms used herein are only for the purpose of describing specific examples, and are not intended to form restriction. The terms "include" and/or "comprise", as used in this specification, denote the existence of said features, integers, members and/or components, but do not exclude the existence or addition of one or more other features, integers, members, components and/or their families. Unless otherwise indicated, a value range described includes the upper and lower limits of the range and any subrange between them.

The above is preferred embodiments of the present application, and it should be noted that for ordinary people in the technical field, improvements and modifications can be made without departing from the principle described in the present application, and these improvements and modifications are also within the protection scope of the present application.

What is claimed is:

1. A battery housing, comprising a first cover body, a second cover body, a sealing member, and a housing body, with the second cover body being welded to the housing body, and the first cover body being adhered to the second cover body through the sealing member to seal the housing body; wherein an adhesion force between the first cover body and the second cover body is less than a first force, and the first force is a force borne by the battery housing when the battery housing explodes;

wherein the adhesion force is 20 N to 100 N;

wherein a middle part of the second cover body is provided with a through hole, and a position of the first cover body corresponding to the through hole bulges towards a direction of the second cover body to form a boss part adapted to the through hole; the sealing member is sleeved around an outer wall of the boss part, and the boss part is embedded into the through hole.

2. The battery housing according to claim 1, wherein the first force is 25 N to 200 N.

3. The battery housing according to claim 1, wherein a surface of the first cover body and a surface of the second cover body are both covered with a passivation layer, and a thickness of the passivation layer is 1 μm to 3 μm, and the adhesion force is proportional to the thickness of the passivation layer.

4. The battery housing according to claim 1, wherein a thickness of the sealing member is 0.1 mm to 0.3 mm, and the adhesion force is proportional to the thickness of the sealing member.

5. The battery housing according to claim 1, wherein the sealing member comprises a first material layer, a base layer, and a second material layer, which are sequentially arranged in layers, the first material layer is adhered to the first cover body, and the second material layer is adhered to the second cover body;

wherein the first material layer and the second material layer have a melting point of 100° C. to 400° C.

6. The battery housing according to claim 5, wherein a thickness of the first material layer is 0.05 mm to 0.1 mm, a thickness of the base layer is 0.05 mm to 0.1 mm, and a thickness of the second material layer is 0.05 mm to 0.1 mm.

7. The battery housing according to claim 1, wherein an area of the sealing member is less than an area of the first cover body and more than ⅔ of an overlapping area between the first cover body and the second cover body, and the adhesion force is proportional to the area of the sealing member.

8. The battery housing according to claim 1, wherein an outer diameter of the first cover body is 7 mm to 15 mm, an outer diameter of the sealing member is 7.5 mm to 15.5 mm, and an outer diameter of the second cover body is 8 mm to 16 mm.

9. The battery housing according to claim 1, wherein the sealing member is configured for sealing and is configured as an explosion-proof device.

10. A battery, comprising the battery housing according to claim 1.

11. The battery according to claim 10, wherein the first force is 25 N to 200 N.

12. The battery according to claim 10, wherein a surface of the first cover body and a surface of the second cover body are both covered with a passivation layer, and a thickness of the passivation layer is 1 μm to 3 μm, and the adhesion force is proportional to the thickness of the passivation layer.

13. The battery according to claim 10, wherein a thickness of the sealing member is 0.1 mm to 0.3 mm, and the adhesion force is proportional to the thickness of the sealing member.

14. The battery according to claim 10, wherein the sealing member comprises a first material layer, a base layer, and a second material layer, which are sequentially arranged in layers, the first material layer is adhered to the first cover body, and the second material layer is adhered to the second cover body;

wherein the first material layer and the second material layer have a melting point of 100° C. to 400° C.

15. The battery according to claim 14, wherein a thickness of the first material layer is 0.05 mm to 0.1 mm, a thickness of the base layer is 0.05 mm to 0.1 mm, and a thickness of the second material layer is 0.05 mm to 0.1 mm.

16. The battery according to claim 10, wherein an area of the sealing member is less than an area of the first cover body and more than ⅔ of an overlapping area between the first cover body and the second cover body, and the adhesion force is proportional to the area of the sealing member.

17. The battery according to claim 10, wherein an outer diameter of the first cover body is 7 mm to 15 mm, an outer diameter of the sealing member is 7.5 mm to 15.5 mm, and an outer diameter of the second cover body is 8 mm to 16 mm.

* * * * *